(12) United States Patent
Evans et al.

(10) Patent No.: US 12,004,259 B2
(45) Date of Patent: Jun. 4, 2024

(54) DEVICES FOR CONFIGURING A SYSTEM AS A USER APPROACHES

(71) Applicant: Cypress Semiconductor Corporation, San Jose, CA (US)

(72) Inventors: Bradley Evans, Northville, MI (US); Nicholas Stopher, Novi, MI (US)

(73) Assignee: Cypress Semiconductor Corporation, San Jose, CA (US)

( * ) Notice: Subject to any disclaimer, the term of this patent is extended or adjusted under 35 U.S.C. 154(b) by 312 days.

(21) Appl. No.: 17/547,662

(22) Filed: Dec. 10, 2021

(65) Prior Publication Data

US 2023/0188970 A1 Jun. 15, 2023

(51) Int. Cl.
*H04W 8/18* (2009.01)
*H04W 4/029* (2018.01)
*H04W 4/30* (2018.01)
*H04W 4/80* (2018.01)
*H04W 88/02* (2009.01)

(52) U.S. Cl.
CPC ............. *H04W 8/18* (2013.01); *H04W 4/029* (2018.02); *H04W 4/30* (2018.02); *H04W 4/80* (2018.02); *H04W 88/02* (2013.01)

(58) Field of Classification Search
None
See application file for complete search history.

(56) References Cited

U.S. PATENT DOCUMENTS

| | | |
|---|---|---|
| 2017/0369071 A1* | 12/2017 | Gould ...................... B60R 25/24 |
| 2019/0291719 A1* | 9/2019 | Tiziani ................. B60W 50/085 |
| 2022/0058329 A1* | 2/2022 | Ricci ...................... G06F 30/398 |
| 2023/0106867 A1* | 4/2023 | Chan ....................... B60R 25/31 |
| | | 701/2 |

\* cited by examiner

*Primary Examiner* — Kenneth B Wells (57) ABSTRACT

A device for a system includes a wireless transceiver, a memory, and a microcontroller. The microcontroller is communicatively coupled to the wireless transceiver and the memory. The microcontroller is configured to receive, via the wireless transceiver, user configuration data in response to a user approaching the system. The microcontroller is configured to store the user configuration data in the memory. The microcontroller is configured to transmit the user configuration data to an interface processor of the system to configure the system based on the user configuration data.

20 Claims, 8 Drawing Sheets

DEVICES FOR CONFIGURING A SYSTEM AS A USER APPROACHES

BACKGROUND

Vehicle infotainment systems and human-machine interfaces (HMIs) typically have limited customization options. In-vehicle customization may be limited to the specific vehicle and the specific seat within the vehicle. For instance, the front seat may have a limited number (e.g., 2) of user profile buttons to adjust the seat to the user's height, set the air conditioning, or change the radio. This profile, however, can only be used in the specific vehicle and in the specific seat. As autonomous vehicles enter the market and ride share services change the model for vehicle ownership, user specific customization will become increasingly important.

For these and other reasons, a need exists for the present disclosure.

SUMMARY

Some examples of the present disclosure relate to a device for a system. The device includes a wireless transceiver, a memory, and a microcontroller. The microcontroller is communicatively coupled to the wireless transceiver and the memory. The microcontroller is configured to receive, via the wireless transceiver, user configuration data in response to a user approaching the system. The microcontroller is configured to store the user configuration data in the memory. The microcontroller is configured to transmit the user configuration data to an interface processor of the system to configure the system based on the user configuration data.

Yet other examples of the present disclosure relate to a system for configuring a vehicle. The system includes a first wireless user device and a vehicle including a wireless transceiver, a memory, and a microcontroller. The microcontroller is communicatively coupled to the wireless transceiver and the memory. The microcontroller is configured to detect the presence of the first wireless user device. The microcontroller is configured to download, via the first wireless transceiver, first user configuration data. The microcontroller is configured to store the first user configuration data in the memory and configure the vehicle based on the first user configuration data.

Yet other examples of the present disclosure relate to a method for configuring a vehicle. The method includes detecting a user approaching the vehicle. The method includes wirelessly downloading user configuration data to the vehicle in response to detecting the user approaching the vehicle. The method includes configuring the vehicle based on the downloaded user configuration data.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

While the following disclosure relates to devices, systems, and methods for configuring vehicles (e.g., cars, trucks, sport utility vehicles (SUVs), etc.), the devices, systems, and methods disclosed herein are also applicable for configuring other systems, such as boats, office spaces, work spaces, hotel rooms, etc., where there could be multiple users. In any case, the devices, systems, and methods disclosed herein may be integrated into any system where user customization is desired as the user approaches and/or enters the area where the system is located.

Typical customization solutions for vehicles are limited to features such as seat adjustment and heating, ventilating, and air conditioning (HVAC). The customization solutions do not have, for example, live connections to the user's mobile phones to select favorite photos, set custom messages, or have custom startup alerts (e.g., "drive safely!"). In addition, typical solutions to the bootup process for infotainment systems before wireless connections may be established are limited. For example, a time requirement may be specified for when an infotainment system is ready for a CarPlay or Android Auto session. During this time, a graphic (e.g., rotating vehicle) is typically displayed on a screen of the infotainment system and the user is delayed while the infotainment system boots. Further, vehicle drivers and passengers lack the ability to have portable user preferences and customized experiences from vehicle to vehicle and/or from seat to seat.

Accordingly, as disclosed herein, to address these issues user configuration data (e.g., preferences, customizations, features, settings, etc.) are stored and maintained using a user passport. The user passport contains the user configuration data and is used to link a vehicle user with their preferences, customizations, features, settings, etc. as they move from vehicle to vehicle and/or from seat to seat. The user passport may be configured once and used in any vehicle compatible with the user passport. The user passport may be configured and/or updated, for example, using a mobile phone application, a web application, and/or an infotainment system of a compatible vehicle.

Figure 1A:
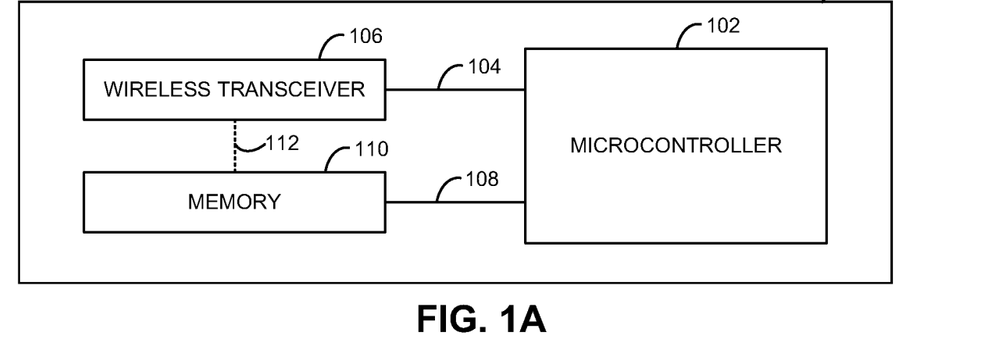
FIGS. 1A and 1B are block diagrams illustrating one example of a device for configuring a system.

FIG. 1A is a block diagram illustrating one example of a device 100a for configuring a system. In one example, the system includes a vehicle. In other examples, the system includes an office space, a work space, a boat, a hotel room, or another suitable space that may be customized using a user passport. Device 100a includes a microcontroller 102, a wireless transceiver 106, and a memory 110. Microcontroller 102 is communicatively coupled to the wireless transceiver 106 through a communication path 104 and to the memory 110 through a communication path 108. Wireless transceiver 106 may be communicatively coupled to memory 110 through a communication path 112. Communication paths 104, 108, and 112 may be quad serial peripheral interface (QSPI) communication paths or other suitable communication paths. Wireless transceiver 106 may include a Bluetooth transceiver, a Wi-Fi transceiver, an ultra-wide band (UWB) transceiver, a satellite network transceiver, and/or a cellular network transceiver. Memory 110 may be a non-volatile memory, such as a flash (e.g., NOR) memory or another suitable memory.

Figure 1B:
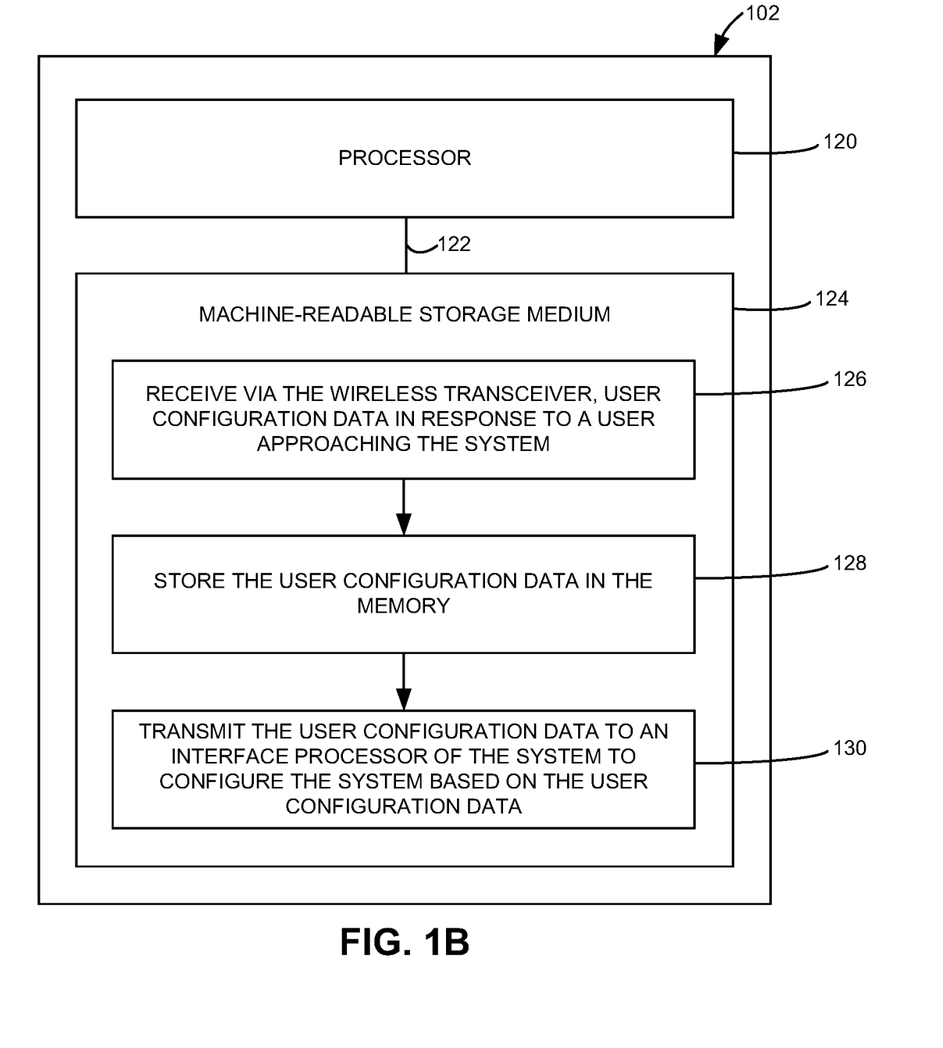

FIG. 1B is a block diagram illustrating one example of the microcontroller 102 of FIG. 1A. Microcontroller 102 includes a processor 120 and a machine-readable storage medium 124. Processor 120 is communicatively coupled to machine-readable storage medium 124 through a communication path 122. Although the following description refers to a single processor and a single machine-readable storage medium, the description may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 120 includes one (i.e., a single) central processing unit (CPU) or microprocessor or more than one (i.e., multiple) CPU or microprocessor, and/or other suitable hardware devices for retrieval and execution of instructions stored in machine-readable storage medium 124. Processor 120 may fetch, decode, and execute instructions 126-130 to configure a system, such as a vehicle.

Processor 120 may fetch, decode, and execute instructions 126 to receive via the wireless transceiver 106 (and through communication path 104), user configuration data in response to a user (e.g., person) approaching the system. The user configuration data may be in the form of a user passport and may include at least one of a temperature setting, a seat setting, a seat warmer setting, a welcome screen setting, a screen background setting, an image, an alert setting, a message setting, an alert, a message, a radio setting, and a music setting. In other examples, the user configuration data may include other settings, such as a desk height setting, a window blind setting, a lighting setting, etc. depending upon the particular application. In one example, the wireless transceiver 106 includes a Bluetooth transceiver, and the microcontroller 102 detects the user approaching the system via the Bluetooth transceiver. In this case, Bluetooth low energy (BLE) connectively with the system may be established for authentication for a custom entry experience. This connectivity may enable a low power wake up of displays and customization features, and authentication by interfacing with a low power microcontroller 102. The low power wake up may accelerate the overall boot time of the system.

Processor 120 may fetch, decode, and execute instructions 128 to store the user configuration data in the memory 110 (e.g., through communication path 108). In other examples, microcontroller 102 may be bypassed, and wireless transceiver 106 may store the user configuration data or portions of the user configuration data in memory 110 through communication path 112. Processor 120 may fetch, decode, and execute instructions 130 to transmit the user configuration data to an interface processor (e.g., 210 to be described below with reference to FIG. 2) of the system to configure the system based on the user configuration data. In one example, where the system is a vehicle, the microcontroller 102 may transmit the user configuration data to the interface processor of the vehicle upon turning on of the vehicle (e.g., turning on the ignition or pressing a power button of the vehicle).

In one example, the user configuration data includes an image, and the microcontroller 102 is configured to enable low-voltage differential signaling (LVDS) video pass through of the interface processor to display the image on a display of the system. In this way, a user specified image may be displayed on the infotainment system of a vehicle as the user enters the vehicle and the infotainment system boots up. This user specified image may replace a default image displayed on the infotainment system during boot up.

As an alternative or in addition to retrieving and executing instructions, processor 120 may include one (i.e., a single) electronic circuit or more than one (i.e., multiple) electronic circuit comprising a number of electronic components for performing the functionality of one of the instructions or more than one of the instructions in machine-readable storage medium 124. With respect to the executable instruction representations (e.g., boxes) described and illustrated herein, it should be understood that part or all of the executable instructions and/or electronic circuits included within one box may, in alternate examples, be included in a different box illustrated in the figures or in a different box not shown.

Machine-readable storage medium 124 is a non-transitory storage medium and may be any suitable electronic, magnetic, optical, or other physical storage device that stores executable instructions. Thus, machine-readable storage medium 124 may be, for example, a random access memory (RAM), an electrically-erasable programmable read-only memory (EEPROM), a storage drive, an optical disc, and the like. Machine-readable storage medium 124 may be disposed within microcontroller 102, as illustrated in FIG. 1B. In this case, the executable instructions may be installed on microcontroller 102. Alternatively, machine-readable storage medium 124 may be a portable, external, or remote storage medium that allows microcontroller 102 to download the instructions from the portable/external/remote storage medium. In this case, the executable instructions may be part of an installation package. In other examples, machine-readable storage medium 124 may be part of memory 110.

Figure 2:
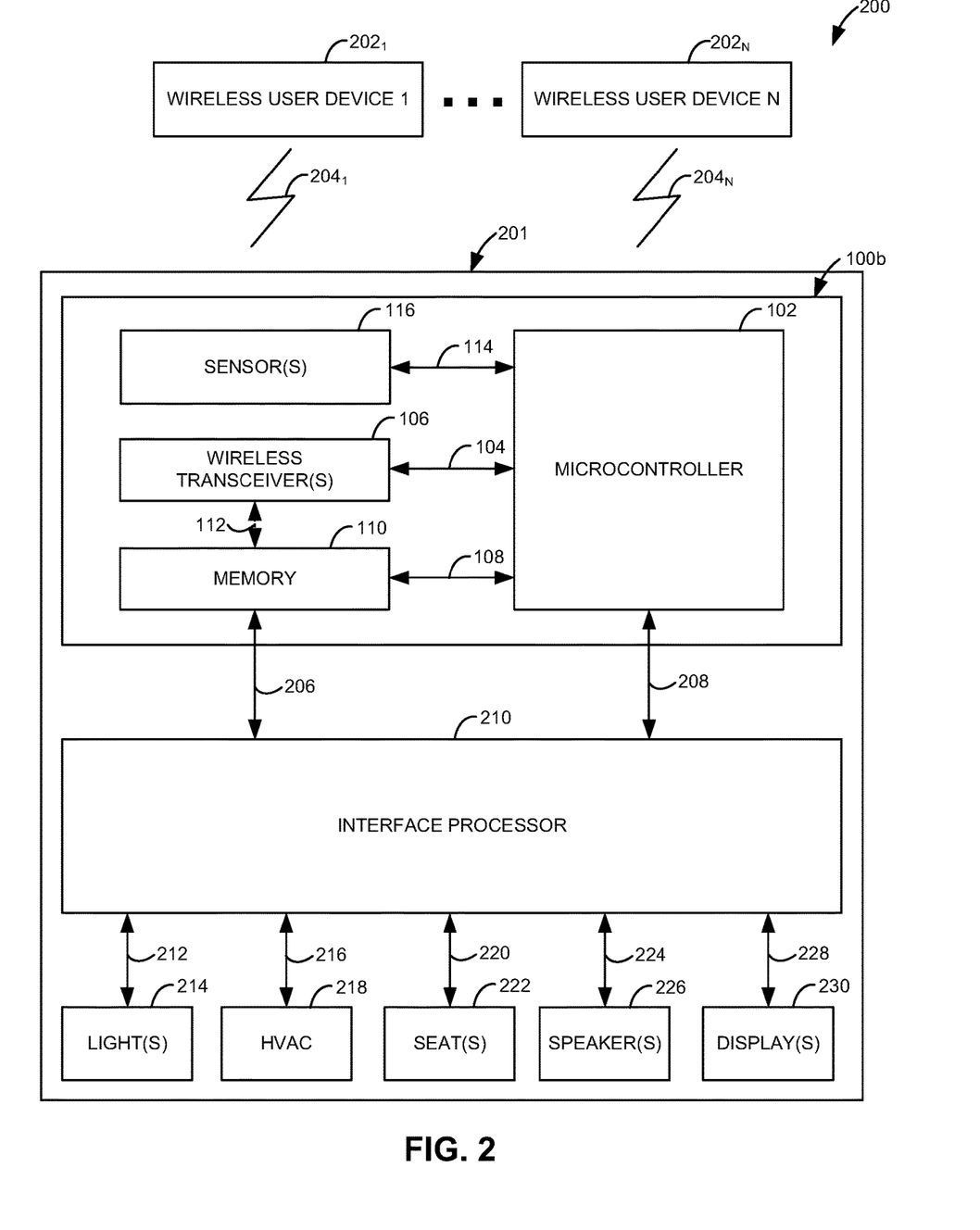
FIG. 2 is a block diagram illustrating one example of a system for configuring a vehicle.

FIG. 2 is a block diagram illustrating one example of a system 200 for configuring a vehicle. System 200 includes a vehicle 201 and a plurality of wireless user devices 202$_1$ to 202$_N$, where "N" is any suitable number of wireless user devices. Vehicle 201 includes a device 100b similar to device 100a previously described and illustrated with reference to FIG. 1A. In addition, vehicle 201 includes an interface processor 210, light(s) 214, HVAC 218, seat(s) 222, speaker(s) 226, and display(s) 230.

In this example, device 100b includes a microcontroller 102, wireless transceiver(s) 106, a memory 110, and sensor(s) 116. Microcontroller 102 is communicatively coupled to the wireless transceiver(s) 106 through the communication path 104, to the memory 110 through the communication path 108, and to the sensor(s) 116 through a communication path 114. Wireless transceiver(s) 106 may be communicatively coupled to the memory 110 through the communication path 112. Memory 110 is communicatively coupled to the interface processor 210 through a communication path 206. Communication path 206 may be a QSPI communication path or another suitable communication path. Microcontroller 102 is communicatively coupled to the interface processor 210 through a communication path 208. Communication path 208 may be a universal asynchronous receiver-transmitter (UART) communication path, a serial peripheral interface (SPI) communication path, or another suitable communication path. Interface processor 210 is electrically coupled to light(s) 214 through a signal path 212, to HVAC 218 through a signal path 216, to seat(s) 222 through a signal path 220, to speaker(s) 226 through a signal path 224, and to displays 230 through a signal path 228.

In some examples, each wireless user device $202_1$ to $202_N$ may be a mobile phone, a key fob, a near field communication (NFC) device, a watch, or another suitable device that can wirelessly communicate with or transmit data to wireless transceiver(s) 106 and/or be sensed by sensor(s) 116. Each wireless user device $202_1$ to $202_N$ may communicate directly or indirectly with wireless transceiver(s) 106 through a wireless communication path $204_1$ to $204_N$, respectively, when the wireless user device is within range of the wireless transceiver(s) 106 and/or sensor(s) 116. Each wireless communication path $204_1$ to $204_N$ may be a Bluetooth communication path, a NFC communication path, a Wi-Fi communication path, an UWB communication path, a cellular network (e.g., long term evolution (LTE)/5G) communication path, a satellite network communication path, and/or another suitable communication path.

Sensor(s) 116 may include one or more cameras, motion sensors, seat sensors, door sensors, fingerprint sensors, retina scanners, NFC sensors, etc., which may be used to detect a user approaching and/or entering the vehicle 201. The sensor(s) 116 may be used to trigger microcontroller 102 to download, via wireless transceiver(s) 106, user configuration data corresponding to the detected user. In some examples, the user configuration data may be downloaded, via wireless transceiver(s) 106, from a wireless user device $202_1$ to $202_N$ of the detected user. In other examples, as described in more detail below with reference to FIG. 3, the user configuration data corresponding to the detected user may be downloaded, via wireless transceiver(s) 106, from a cloud storage system. The downloaded user configuration data may be stored in memory 110.

Interface processor 210 may be a processor of an infotainment system, telematics unit, headunit, electrical instrument cluster, or other control system of the vehicle 201. The interface processor 210 controls light(s) 214, HVAC 218, seat(s) 222, speaker(s) 226, and display(s) 230 of the vehicle 201. In some examples, interface processor 210 includes low-voltage differential signaling (LVDS) video pass through such that microcontroller 102 can display images on a display(s) 230 (e.g., through communication paths 208 and 228) with interface processor 210 powered down and during boot up of interface processor 210. Interface processor 210 may access memory 110 through communication path 206 to read the user configuration data stored in the memory 110 and configure and/or control light(s) 214, HVAC 218, seat(s) 222, speaker(s) 226, and display(s) 230 based on the user configuration data. For example, interface processor 210 may, based on the user configuration data, set the temperature of the HVAC 218 to 71° F., adjust a seat 222 to +72 cm, disable the seat warmer of the seat 222, display a user defined welcome screen on a display 230, set a background for a display 230 to a family photo, enable alerts (audible alerts through speaker(s) 226 and/or visual alerts through display(s) 230), set a driver score setting to tracked, and play selected music through speaker(s) 226 upon entry.

Figure 3:
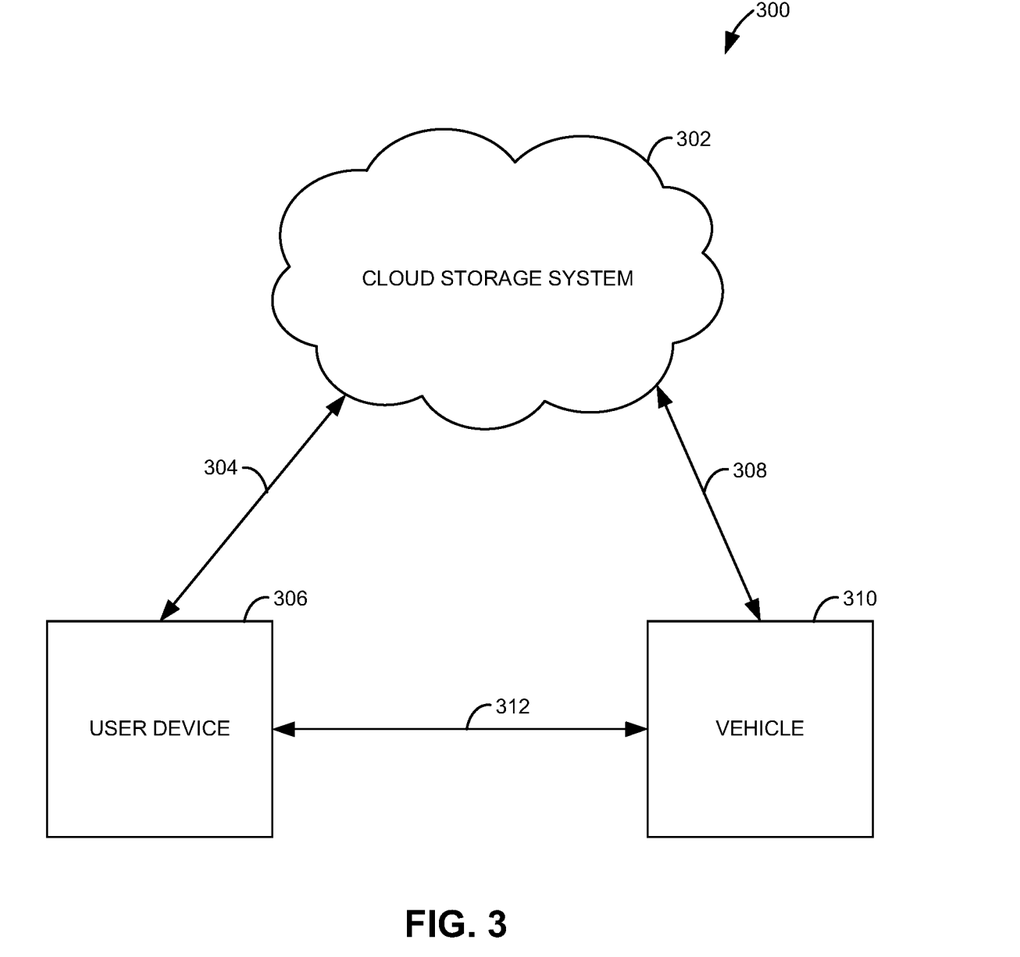
FIG. 3 is a block diagram illustrating another example of a system for configuring a vehicle.

FIG. 3 is a block diagram illustrating another example of a system 300 for configuring a vehicle. System 300 includes a cloud storage system 302, a user device 306, and a vehicle 310. Cloud storage system 302 may be communicatively coupled to user device 306 through a communication path 304 and to vehicle 310 through a communication path 308. Communication paths 304 and 308 may include a satellite communication path, a cellular communication path, a Wi-Fi communication path, and/or another suitable communication path. User device 306 may be communicatively coupled to vehicle 310 through a communication path 312. Communication path 312 may include a wireless communication path, such as a Bluetooth communication path, a Wi-Fi communication path, an UWB communication path, or a cellular network communication path; or a wired communication path, such as a UART communication path, a SPI communication path, and/or another suitable communication path.

In some examples, user device 306 may be a user device $202_1$ to $202_N$ and vehicle 310 may be vehicle 201 previously described and illustrated with reference to FIG. 2. In other examples, user device 306 may be an entry device and/or sensor, such as sensor(s) 116 of FIG. 2 (e.g., camera, motion sensor, seat sensor, door sensor, fingerprint sensor, retina scanner, NFC sensor, etc.). In this example, the user configuration data corresponding to a user may be stored in cloud storage system 302. In some examples, the user configuration data stored in cloud storage system 302 may be configured and/or updated via user device 306 through communication path 304. In other examples, the user configuration data stored in the cloud storage system 302 may be configured and/or updated via other devices, such as a computer. In response to detecting a user approaching and/or entering the vehicle 310 via user device 306 and communication path 312, vehicle 310 downloads the user configuration data (corresponding to the user) from cloud storage system 302 through communication path 308 and configures the vehicle based on the user configuration data.

Figure 4:
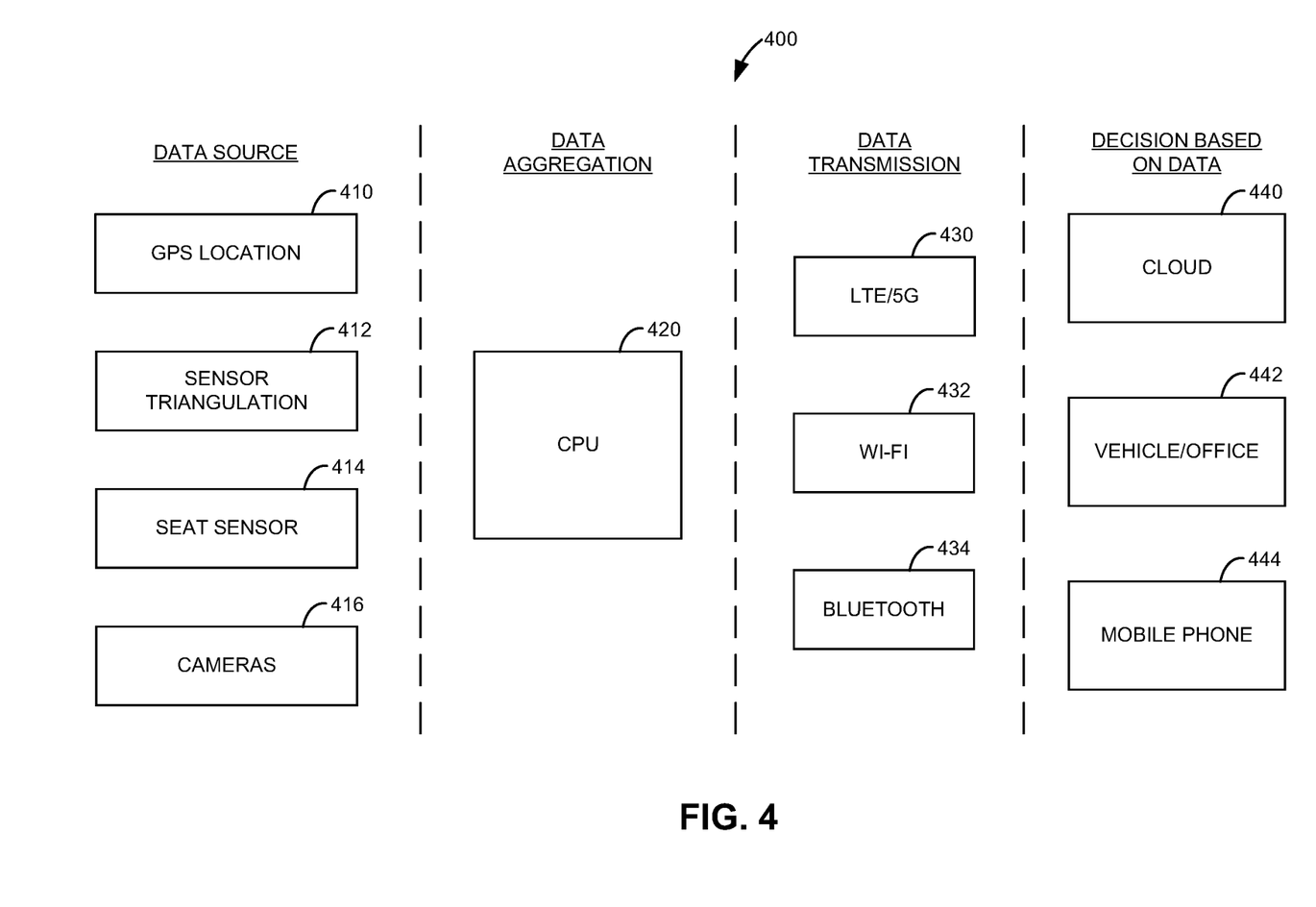
FIG. 4 is a decision making flow chart for entry to a vehicle or other system.

FIG. 4 is a decision making flow chart 400 for entry to a vehicle or other system. Decision making flow chart 400 begins with data sources. The data sources may include global positioning system (GPS) location 410, sensor triangulation 412, seat sensor 414, and/or cameras 416. The GPS location 410 may be provided by a wireless user device (e.g., mobile phone, watch, etc.), such as a wireless user device $202_1$ to $202_N$ of FIG. 2. The sensor triangulation 412 may be provided based on a wireless user device (e.g., mobile phone, key fob, NFC device, watch, etc.), such as a wireless user device $202_1$ to $202_N$ of FIG. 2, in combination with wireless transceivers (e.g., via Bluetooth angle of arrival (AoA)) and/or sensors, such as wireless transceiver(s) 106 and/or sensor(s) 116 and of FIG. 2. Seat sensors 414 may include weight sensors, capacitance sensors, and seatbelt sensors that sense when a seat of a vehicle or other system (e.g., office) is occupied. The cameras 416 may be used to detect users using person detection and/or facial recognition.

The data sources may then be aggregated by a central processing unit (CPU) 420 or another suitable processor. The CPU 420 may be a mobile phone processor, a computer (e.g., laptop) processor, a headunit processor, or a processor of another suitable device. In some examples, the data aggregation may be skipped if the data from the data sources is sent directly to the decision device by each individual data source. The data may be transmitted from the data sources to the data aggregation device and/or to the decision device, and/or from the data aggregation device to the decision device via LTE/5G 430, Wi-Fi 432, and/or Bluetooth 434. LTE/5G 430 data transmission may use a data plan of the user. Wi-Fi 432 data transmission may use a local access point or a direct mobile phone connection. Bluetooth 434 data transmission may use a mobile phone of the user.

A decision may be made based on the data provided by the data sources, aggregated by the data aggregation device, and transmitted to a decision device, such as the cloud 440, a vehicle/office device 442, and/or a mobile phone 444. The cloud 440 may be a service provided by a cloud service provider. The vehicle/office device 442 may be a telematics unit, a headunit, an electronics instrument cluster, or another suitable device. The mobile phone 444 may be the user's mobile phone. The decision device may receive data from data sources of multiple users simultaneously and download user configuration data for each of the multiple users. In this case, the decision device may analyze the received data to determine which, if any, of the multiple users, intends to be the operator of the vehicle or worker in the office and which of the multiple users are passengers in the vehicle or guests in the office. The decision device may also analyze the received data to determine where each of the multiple users is seated to implement customization features for each user based on the user's downloaded configuration data and where the user is seated.

Figure 5A:
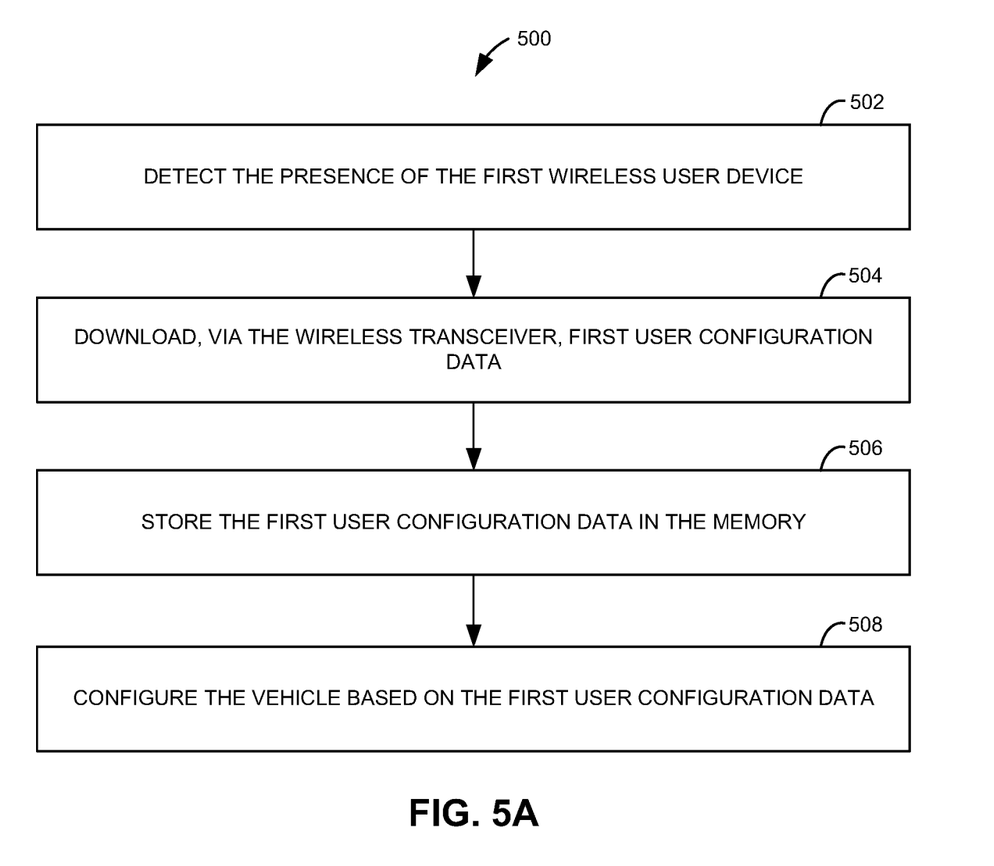
FIGS. 5A and 5B are flow diagrams illustrating one example of a method for configuring a vehicle.
Figure 5B:
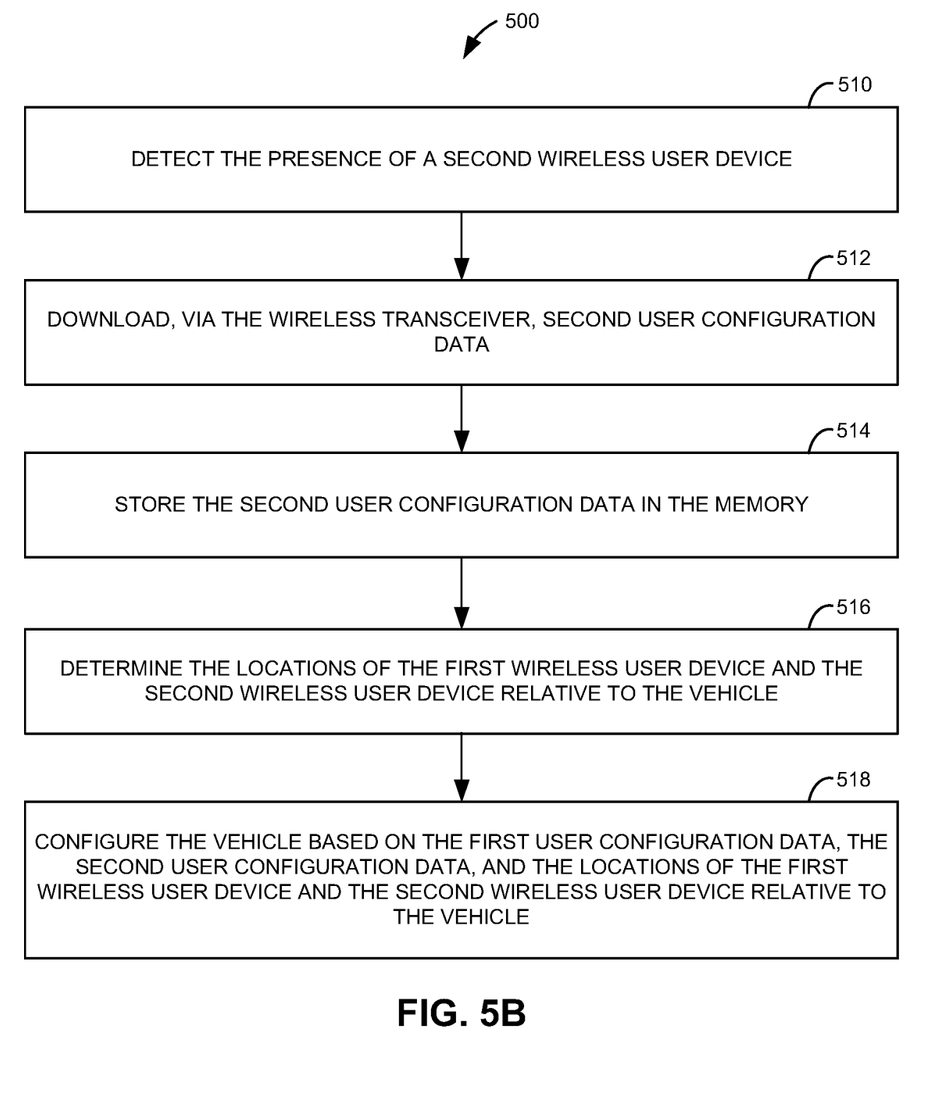

FIGS. 5A and 5B are flow diagrams illustrating one example of instructions 500 that may be executed in a system (e.g., 200 of FIG. 2) for configuring a vehicle (e.g., 201 of FIG. 2). In this example, the system may include a first wireless user device and a second wireless user device, such as two of wireless user devices $202_1$ to $202_N$ of FIG. 2. In addition, the system may include a wireless transceiver (e.g., 106), a memory (e.g., 110), and a microcontroller (e.g., 102) communicatively coupled to the wireless transceiver and the memory. The instructions 500 may be stored in a computer-readable storage medium (e.g., 124 of FIG. 1B) to be executed by a processor (e.g., 120 of FIG. 1B) of the microcontroller.

As illustrated in FIG. 5A at 502, the microcontroller may be configured to detect the presence of the first wireless user device. At 504, the microcontroller may be configured to download, via the wireless transceiver, first user configuration data. In one example, the first wireless user device is a mobile phone and the wireless transceiver is a Bluetooth transceiver. In this case, the microcontroller is configured to download, via the Bluetooth transceiver, the first user configuration data from the mobile phone. In other examples, the system may further include a sensor (e.g., 116 of FIG. 2) to detect the presence of the first wireless user device. In this case, the wireless user device may include a key fob, a mobile phone, a NFC device, a watch, or another suitable wireless user device, and the wireless transceiver may be a Wi-Fi transceiver, a satellite network transceiver, or a cellular network transceiver. The microcontroller may be configured to download, via the wireless transceiver, the first user configuration data from a cloud storage system (e.g., 302 of FIG. 3) based on the detected presence of the first wireless user device.

At 506, the microcontroller may be configured to store the first user configuration data in the memory. At 508, the microcontroller may be configured to configure the vehicle based on the first user configuration data. In some examples, the system may further include a vehicle interface processor (e.g., 210 of FIG. 2) communicatively coupled to the microcontroller and the memory. In this case, the vehicle interface processor may be powered down when the microcontroller detects the presence of the first wireless user device, downloads the first user configuration data, and stores the first user configuration data in the memory. The system may further include a display (e.g., 230 of FIG. 2) electrically coupled to the vehicle interface processor, a HVAC system (e.g., 218 of FIG. 2) electrically coupled to the vehicle interface processor, a seat (e.g., 222 of FIG. 2) electrically coupled to the vehicle interface processor, and a speaker (e.g., 226 of FIG. 2) electrically coupled to the vehicle interface processor. In this case, the vehicle interface processor may be configured to control the display, the HVAC system, the seat, and the speaker based on the first user configuration data stored in the memory.

As illustrated in FIG. 5B at 510, the microcontroller may be further configured to detect the presence of a second wireless user device. At 512, the microcontroller may be further configured to download, via the wireless transceiver, second user configuration data. At 514, the microcontroller may be further configured to store the second user configuration data in the memory. At 516, the microcontroller may be further configured to determine the locations of the first wireless user device and the second wireless user device relative to the vehicle. At 518, the microcontroller may be further configured to configure the vehicle based on the first user configuration data, the second user configuration data, and the locations of the first wireless user device and the second wireless user device relative to the vehicle. In this way, the vehicle may be configured based on the user configuration data of multiple users depending upon how each user approaches and/or enters the vehicle. For example, the user configuration data of a user approaching/entering from the driver's side may be used to configure the driver's seat, driver's side HVAC settings, and driver display settings, while the user configuration data of a user approaching/entering from the passenger's side may be used to configure the passenger's seat, passenger's side HVAC settings, and passenger display settings.

Figure 6A:
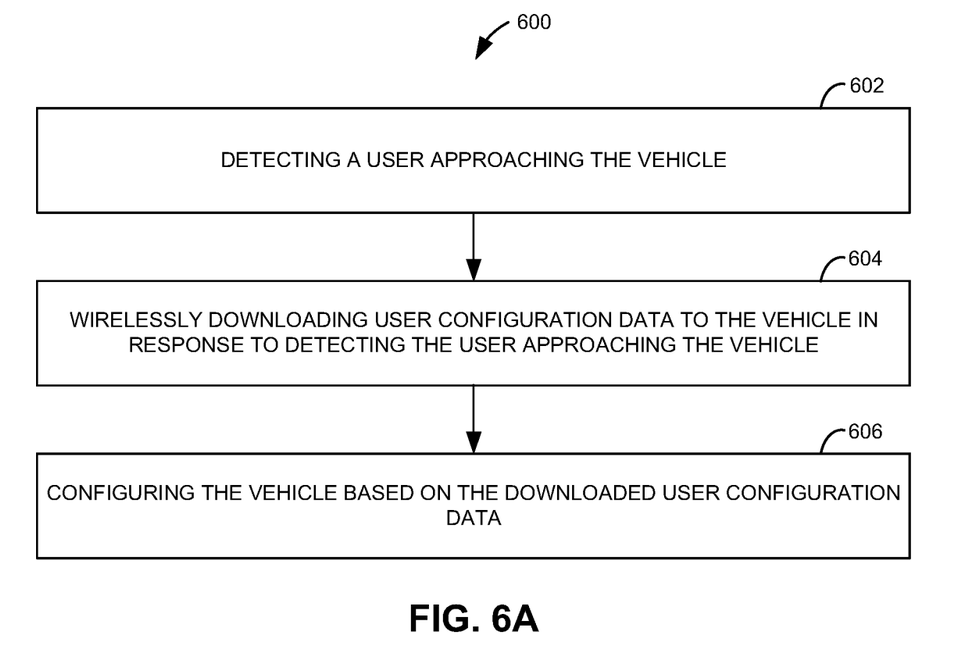
FIGS. 6A-6D are flow diagrams illustrating another example of a method for configuring a vehicle.

FIGS. 6A-6D are flow diagrams illustrating another example of a method 600 for configuring a vehicle. Method 600 may be implemented by system 200 previously described and illustrated with reference to FIG. 2. As illustrated in FIG. 6A at 602, method 600 includes detecting a user approaching the vehicle. In some examples, a user may be detected approaching the vehicle by detecting the presence of a wireless user device (e.g., key fob, mobile phone, NFC device, watch, etc.) possessed by the user. In other examples, a user may be detected approaching and/or entering the vehicle by cameras (e.g., person recognition, face recognition), sensors (e.g., motion sensor, seat sensor, door sensor, fingerprint sensor, retina scanner, etc.), and/or input devices (e.g., flash drive) without the presence of a wireless user device. At 604, method 600 includes wirelessly downloading user configuration data to the vehicle in response to detecting the user approaching the vehicle. In one example, wirelessly downloading the user configuration data includes wirelessly downloading the user configuration data from a user device (e.g., key fob, mobile phone, NFC device, watch, etc.) possessed by the user. In other examples, wirelessly downloading the user configuration data includes wirelessly downloading the user configuration data from a cloud storage system. At 606, method 600 includes configuring the vehicle based on the downloaded user configuration data. In some examples, the user configuration data may include a temperature setting, a seat setting, a seat warmer setting, a welcome screen setting, a screen background setting, an image, an alert setting, a message setting, an alert, a message, a driver score setting, a radio setting, and/or a music setting.

Figure 6B:
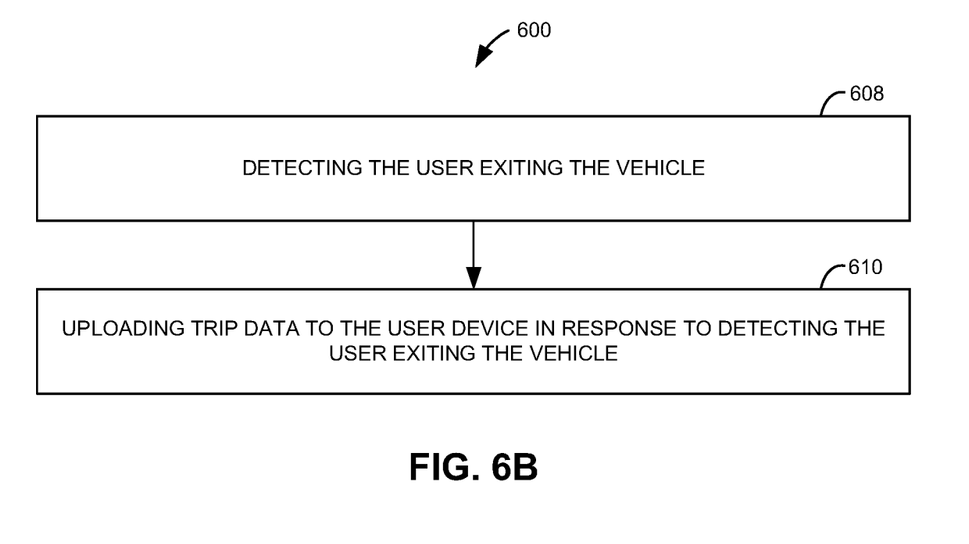

In some examples, as illustrated in FIG. 6B at 608, method 600 may further include detecting the user exiting the vehicle. The user may be detected exiting the vehicle by detecting the removal/absence of a wireless user device (e.g., key fob, mobile phone, NFC device, watch, etc.) possessed by the user. In other examples, a user may be detected exiting the vehicle by cameras or sensors. At 610, method 600 may further include uploading trip data to the user device in response to detecting the user exiting the vehicle. The trip data may include, for example, a vehicle identifier, a total trip time, a maximum speed, an average speed, route information, driving efficiency, insurance score, trip fee (e.g., for ride share, taxi, etc.), trip rating, number of passengers, etc.

Figure 6C:
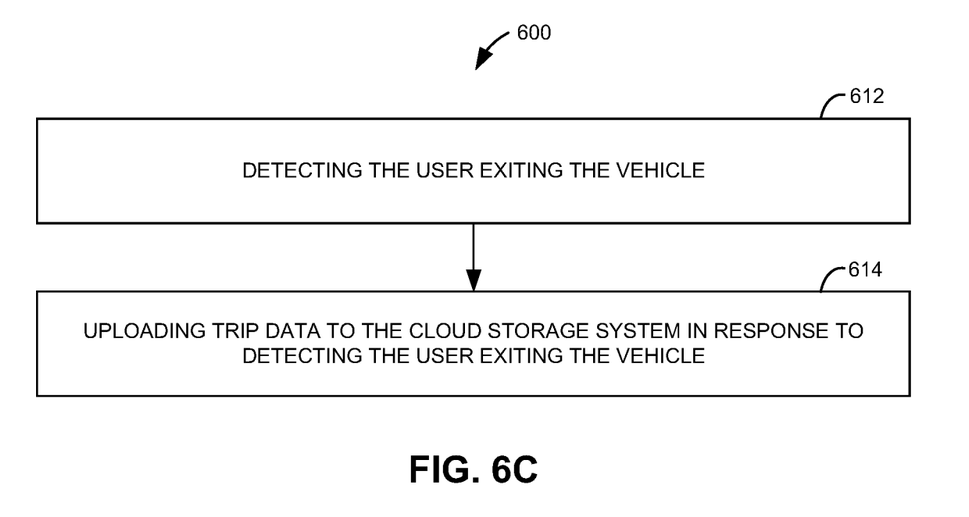
Figure 6D:
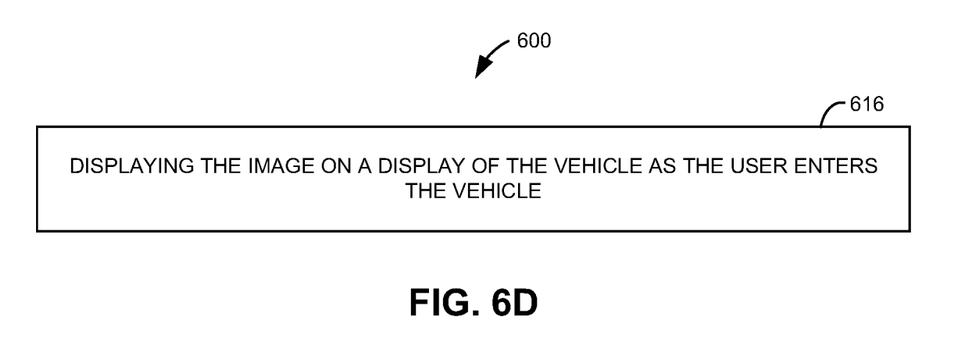

In other examples, as illustrated in FIG. 6C at 612, method 600 may further include detecting the user exiting the vehicle. At 614, method 600 may further include uploading trip data to the cloud storage system in response to detecting the user exiting the vehicle. In some examples, the downloaded user configuration data may include an image. In this case, as illustrated in FIG. 6D at 616, method 600 may further include displaying the image on a display of the vehicle as the user enters the vehicle.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A device for a system, the device comprising:
a wireless transceiver;
a memory; and
a microcontroller communicatively coupled to the wireless transceiver and the memory, the microcontroller configured to:
receive, via the wireless transceiver, user configuration data in response to a user approaching the system;
store the user configuration data in the memory;
transmit the user configuration data to an interface processor of the system to configure the system based on the user configuration data; and
enable low-voltage differential signaling (LVDS) video pass through of the interface processor with the interface processor powered down and during boot up of the interface processor.

2. The device of claim 1, wherein the system comprises a vehicle.

3. The device of claim 2, wherein the user configuration data comprises at least one of a temperature setting, a seat setting, a seat warmer setting, a welcome screen setting, a screen background setting, an image, an alert setting, a message setting, an alert, a message, a radio setting, and a music setting.

4. The device of claim 1, wherein the user configuration data comprises an image, and
wherein the microcontroller is configured to enable low-voltage differential signaling (LVDS) video pass through of the interface processor to display the image on a display of the system.

5. The device of claim 1, wherein the wireless transceiver comprises at least one of a Bluetooth transceiver, a Wi-Fi transceiver, an ultra-wide band transceiver, a satellite network transceiver, and a cellular network transceiver.

6. The device of claim 1, wherein the wireless transceiver comprises a Bluetooth transceiver, and
wherein the microcontroller detects the user approaching the system via the Bluetooth transceiver.

7. The device of claim 2, wherein the microcontroller transmits the user configuration data to the interface processor of the vehicle upon turning on of the vehicle.

8. A system for configuring a vehicle, the system comprising:
a first wireless user device;
a vehicle comprising a wireless transceiver, a memory, a microcontroller communicatively coupled to the wireless transceiver and the memory, a vehicle interface processor communicatively coupled to the microcontroller and the memory, and a display electrically coupled to the vehicle interface processor;
wherein the microcontroller is configured to:
detect the presence of the first wireless user device;
download, via the wireless transceiver, first user configuration data;
store the first user configuration data in the memory;
configure the vehicle based on the first user configuration data; and
enable low-voltage differential signaling (LVDS) video pass through of the vehicle interface processor with the vehicle interface processor powered down and during boot up of the vehicle interface processor.

9. The system of claim 8, wherein the first wireless user device comprises a mobile phone and the wireless transceiver comprises a Bluetooth transceiver, and
wherein the microcontroller is configured to download, via the Bluetooth transceiver, the first user configuration data from the mobile phone.

10. The system of claim 8, further comprising:
a sensor to detect the presence of the first wireless user device,
wherein the first wireless user device comprises one of a key fob, a mobile phone, a near field communication (NFC) device, and a watch,
wherein the wireless transceiver comprises one of a Wi-Fi transceiver, a satellite network transceiver, and a cellular network transceiver, and
wherein the microcontroller is configured to download, via the wireless transceiver, the first user configuration data from a cloud storage system based on the detected presence of the first wireless user device.

11. The system of claim 8,
wherein the vehicle interface processor is powered down when the microcontroller detects the presence of the first wireless user device, downloads the first user configuration data, and stores the first user configuration data in the memory.

12. The system of claim 11, further comprising:
a heating, ventilating, and air conditioning (HVAC) system electrically coupled to the vehicle interface processor;
a seat electrically coupled to the vehicle interface processor; and
a speaker electrically coupled to the vehicle interface processor,
wherein the vehicle interface processor is configured to control the display, the HVAC system, the seat, and the speaker based on the first user configuration data stored in the memory.

13. The system of claim 8, wherein the microcontroller is configured to:
detect the presence of a second wireless user device;
download, via the wireless transceiver, second user configuration data;
store the second user configuration data in the memory;
determine the locations of the first wireless user device and the second wireless user device relative to the vehicle; and configure the vehicle based on the first user configuration data, the second user configuration data, and the locations of the first wireless user device and the second wireless user device relative to the vehicle.

14. A method for configuring a vehicle, the method comprising:
    detecting a user approaching the vehicle;
    wirelessly downloading user configuration data to the vehicle in response to detecting the user approaching the vehicle;
    configuring the vehicle based on the downloaded user configuration data; and
    enabling low-voltage differential signaling (LVDS) video pass through a vehicle interface processor of the vehicle with the vehicle interface processor powered down and during boot up of the vehicle interface processor.

15. The method of claim 14, wherein wirelessly downloading the user configuration data comprises wirelessly downloading the user configuration data from a user device possessed by the user.

16. The method of claim 15, further comprising:
    detecting the user exiting the vehicle; and
    uploading trip data to the user device in response to detecting the user exiting the vehicle.

17. The method of claim 14, wherein wirelessly downloading the user configuration data comprises wirelessly downloading the user configuration data from a cloud storage system.

18. The method of claim 17, further comprising:
    detecting the user exiting the vehicle; and
    uploading trip data to the cloud storage system in response to detecting the user exiting the vehicle.

19. The method of claim 14, wherein the user configuration data comprises at least one of a temperature setting, a seat setting, a seat warmer setting, a welcome screen setting, a screen background setting, an image, an alert setting, a message setting, an alert, a message, a driver score setting, a radio setting, and a music setting.

20. The method of claim 14, wherein the downloaded user configuration data comprises an image, the method further comprising:
    displaying the image on a display of the vehicle as the user enters the vehicle.

* * * * *